US012567157B1

(12) United States Patent
Negoita et al.

(10) Patent No.: US 12,567,157 B1
(45) Date of Patent: Mar. 3, 2026

(54) CONTEXT-BASED MODE TRANSITIONS FOR OBJECT TRACKING

(71) Applicant: Apple Inc., Cupertino, CA (US)

(72) Inventors: Ioana Negoita, San Jose, CA (US); Brian W. Temple, Santa Clara, CA (US); Lee Sparks, Lake Forest, CA (US)

(73) Assignee: APPLE INC., Cupertino, CA (US)

( * ) Notice: Subject to any disclaimer, the term of this patent is extended or adjusted under 35 U.S.C. 154(b) by 274 days.

(21) Appl. No.: 18/369,343

(22) Filed: Sep. 18, 2023

Related U.S. Application Data

(60) Provisional application No. 63/408,734, filed on Sep. 21, 2022.

(51) Int. Cl.
　　*G06K 9/00* 　　　(2022.01)
　　*G06T 7/20* 　　　(2017.01)
　　*G06T 7/70* 　　　(2017.01)
(52) U.S. Cl.
　　CPC .................. *G06T 7/20* (2013.01); *G06T 7/70* (2017.01); *G06T 2207/30196* (2013.01)

(58) Field of Classification Search
　　CPC ........ G06F 3/011; G06F 3/017; G06F 3/0482; G06V 20/20; G06V 20/52; G06V 40/28; G06V 40/20
　　See application file for complete search history.

(56) References Cited

U.S. PATENT DOCUMENTS

| | | | |
|---|---|---|---|
| 10,636,170 | B1 * | 4/2020 | Reddy .................... G06F 3/012 |
| 2019/0094966 | A1 * | 3/2019 | Kulkarni .............. G06T 19/006 |
| 2020/0089967 | A1 * | 3/2020 | Velipasalar .......... G06T 3/4046 |

* cited by examiner

*Primary Examiner* — Hadi Akhavannik
(74) *Attorney, Agent, or Firm* — Fernando & Partners, LLP

(57) ABSTRACT

In some implementation, a method includes: while operating according to a first mode, obtaining audio data associated with a physical environment and motion sensor data; determining whether at least one of the audio data and the motion sensor data satisfies a mode transition criterion; in response to determining that at least one of the audio data and the motion sensor data satisfies the mode transition criterion, transitioning the computing system from the first mode to a second mode; and while operating according to the second mode: obtaining image frames of the physical environment based on an image frame ingestion rate; determining a current location for an enrolled object by performing a set of image processing functions on the image frames; and updating a record for the enrolled object to include the current location.

22 Claims, 10 Drawing Sheets

Enrolled Object
Datastore 515

517A

517B

517N

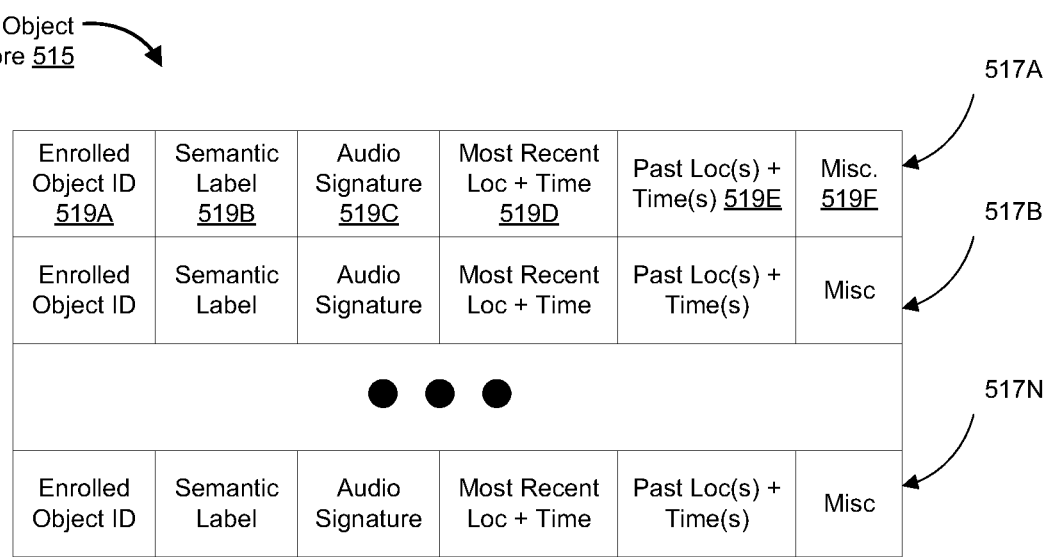

| Enrolled Object ID 519A | Semantic Label 519B | Audio Signature 519C | Most Recent Loc + Time 519D | Past Loc(s) + Time(s) 519E | Misc. 519F |
|---|---|---|---|---|---|
| Enrolled Object ID | Semantic Label | Audio Signature | Most Recent Loc + Time | Past Loc(s) + Time(s) | Misc |
| ● ● ● | | | | | |
| Enrolled Object ID | Semantic Label | Audio Signature | Most Recent Loc + Time | Past Loc(s) + Time(s) | Misc |

Enrolled Object
Monitoring
Continuum 575

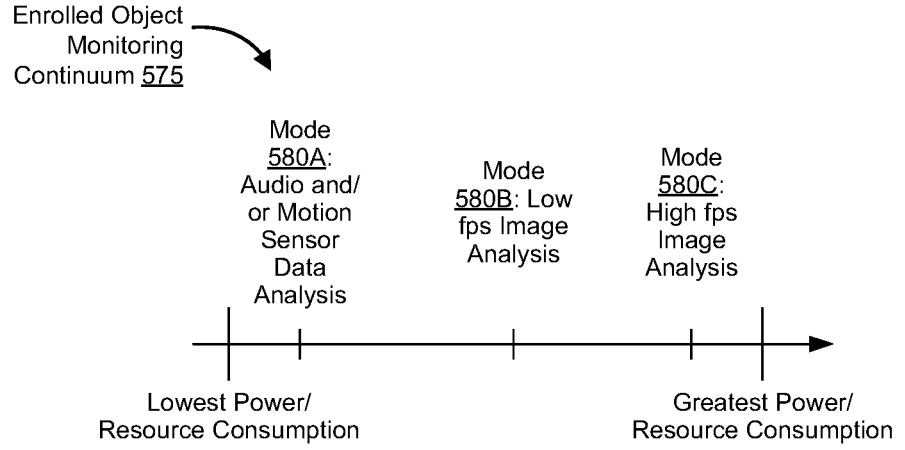

Mode 580A: Audio and/ or Motion Sensor Data Analysis

Mode 580B: Low fps Image Analysis

Mode 580C: High fps Image Analysis

Lowest Power/
Resource Consumption

Greatest Power/
Resource Consumption

Figure 5B

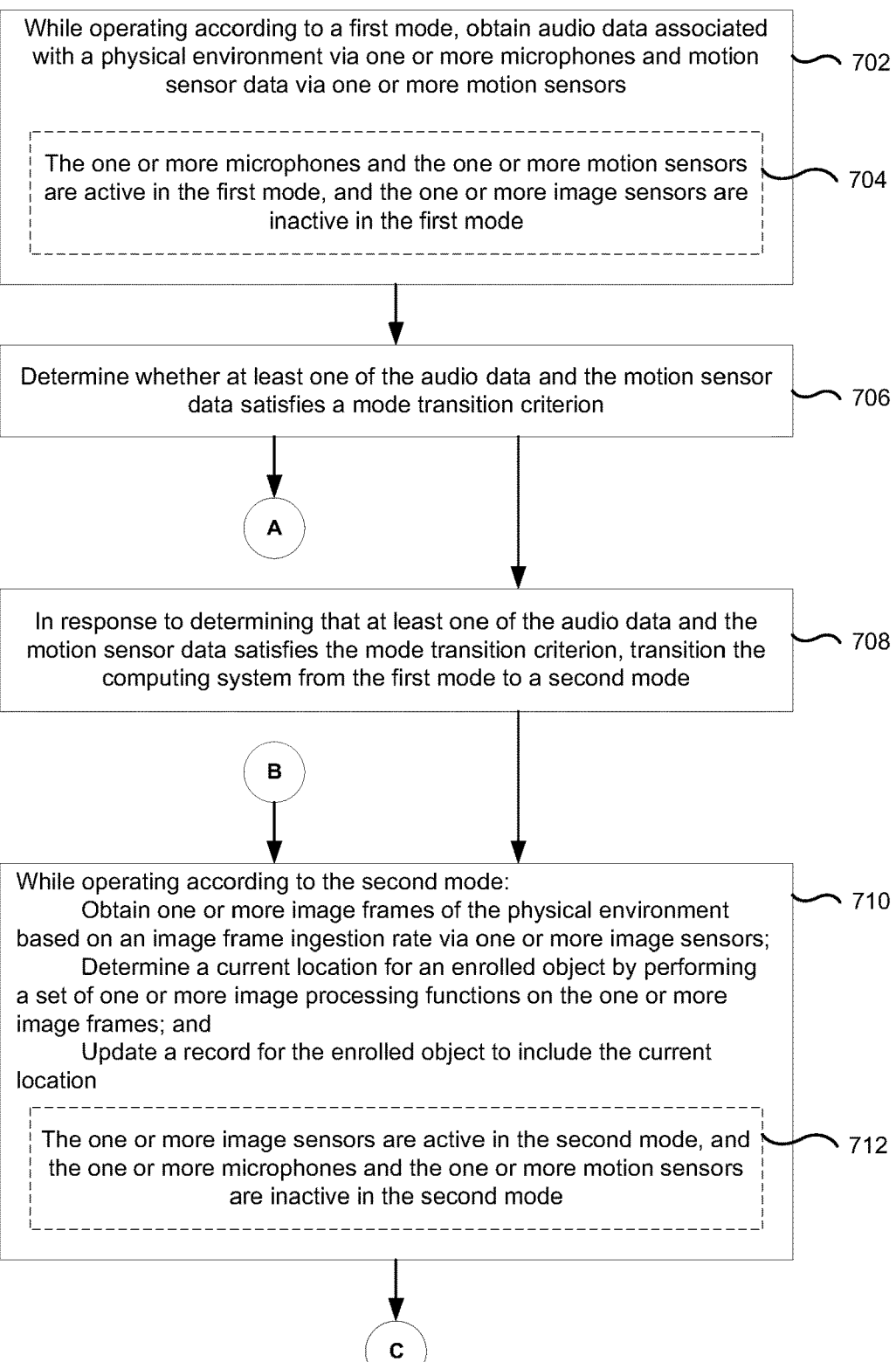

700

While operating according to a first mode, obtain audio data associated with a physical environment via one or more microphones and motion sensor data via one or more motion sensors — 702

The one or more microphones and the one or more motion sensors are active in the first mode, and the one or more image sensors are inactive in the first mode — 704

Determine whether at least one of the audio data and the motion sensor data satisfies a mode transition criterion — 706

A

In response to determining that at least one of the audio data and the motion sensor data satisfies the mode transition criterion, transition the computing system from the first mode to a second mode — 708

B

While operating according to the second mode:
    Obtain one or more image frames of the physical environment based on an image frame ingestion rate via one or more image sensors;
    Determine a current location for an enrolled object by performing a set of one or more image processing functions on the one or more image frames; and
    Update a record for the enrolled object to include the current location — 710

The one or more image sensors are active in the second mode, and the one or more microphones and the one or more motion sensors are inactive in the second mode — 712

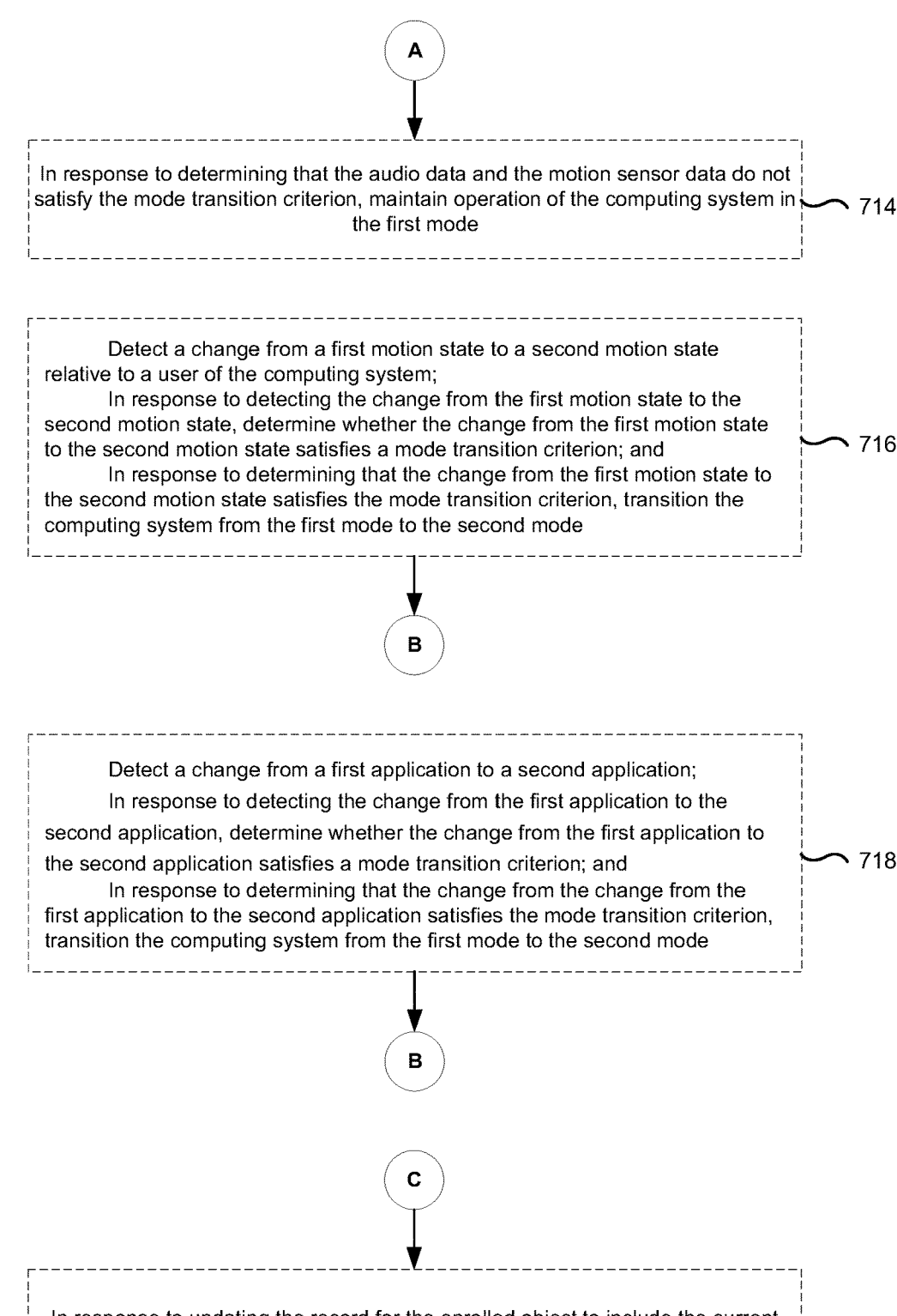

In response to determining that the audio data and the motion sensor data do not satisfy the mode transition criterion, maintain operation of the computing system in the first mode ⟶ 714

Detect a change from a first motion state to a second motion state relative to a user of the computing system;
In response to detecting the change from the first motion state to the second motion state, determine whether the change from the first motion state to the second motion state satisfies a mode transition criterion; and
In response to determining that the change from the first motion state to the second motion state satisfies the mode transition criterion, transition the computing system from the first mode to the second mode ⟶ 716

B

Detect a change from a first application to a second application;
In response to detecting the change from the first application to the second application, determine whether the change from the first application to the second application satisfies a mode transition criterion; and
In response to determining that the change from the change from the first application to the second application satisfies the mode transition criterion, transition the computing system from the first mode to the second mode ⟶ 718

B

C

In response to updating the record for the enrolled object to include the current location, cause presentation of a movement notification including a representation of the current location for the enrolled object via a display device ⟶ 720

Figure 7B

CONTEXT-BASED MODE TRANSITIONS FOR OBJECT TRACKING

CROSS-REFERENCE TO RELATED APPLICATIONS

This application is claims priority to U.S. Provisional Patent App. No. 63/408,734, filed on Sep. 21, 2022, which is hereby incorporated by reference in its entirety.

TECHNICAL FIELD

The present disclosure generally relates to tracking/monitoring objects and, in particular, to systems, devices, and methods for context-based mode transitions for object tracking.

BACKGROUND

A computing system may enroll and track physical objects of interest. As one example, a scene camera may continuously capture images of a physical environment to track enrolled objects therein. In this example, the captured images are subsequently analyzed in order to recognize enrolled objects and determine their current locations for tracking purposes. However, constant analysis of these images may consume significant power and computing resources.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5B illustrates an enrolled object datastore and an enrolled object monitoring continuum associated with the enrolled object monitoring architecture in FIG. 5A in accordance with some implementations.

FIGS. 7A and 7B illustrate a flowchart representation of a method of context-based mode transitions for object tracking in accordance with some implementations.

Figure 1:
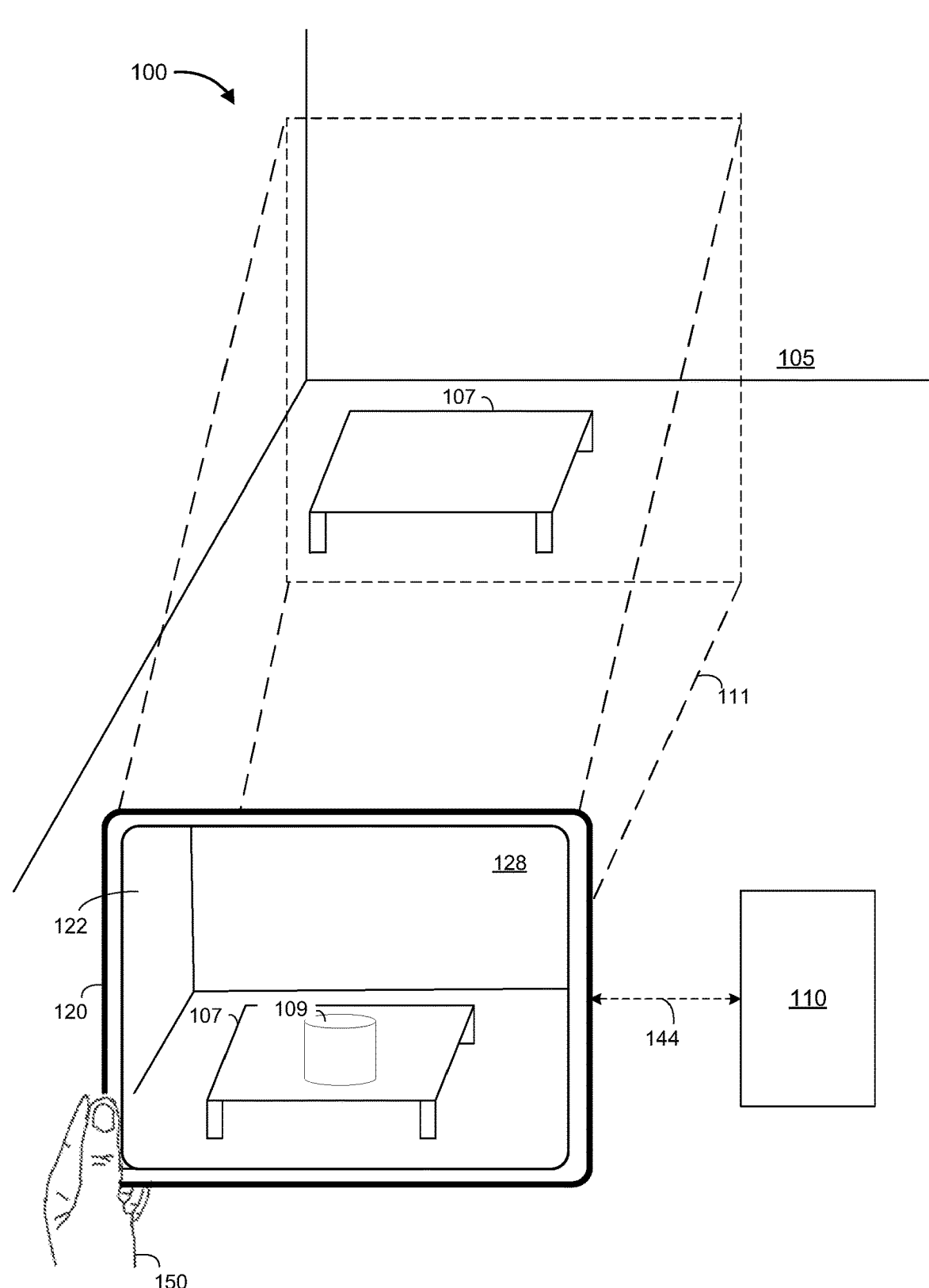
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for context-based mode transitions for object tracking. According to some implementations, the method is performed at a computing system including non-transitory memory and one or more processors, wherein the computing system is communicatively coupled to one or more microphones, one or more image sensors, and one or more motion sensors via a communication interface. The method includes: while operating the computing system according to a first mode, obtaining audio data associated with a physical environment and motion sensor data; determining whether at least one of the audio data and the motion sensor data satisfies a mode transition criterion; in response to determining that at least one of the audio data and the motion sensor data satisfies the mode transition criterion, transitioning the computing system from the first mode to a second mode; and while operating the computing system according to the second mode; obtaining one or more image frames of the physical environment based on an image frame ingestion rate via the one or more image sensors; determining a current location for an enrolled object by performing a set of one or more image processing functions on the one or more image frames; and updating a record for the enrolled object to include the current location.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an extended reality (XR) experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
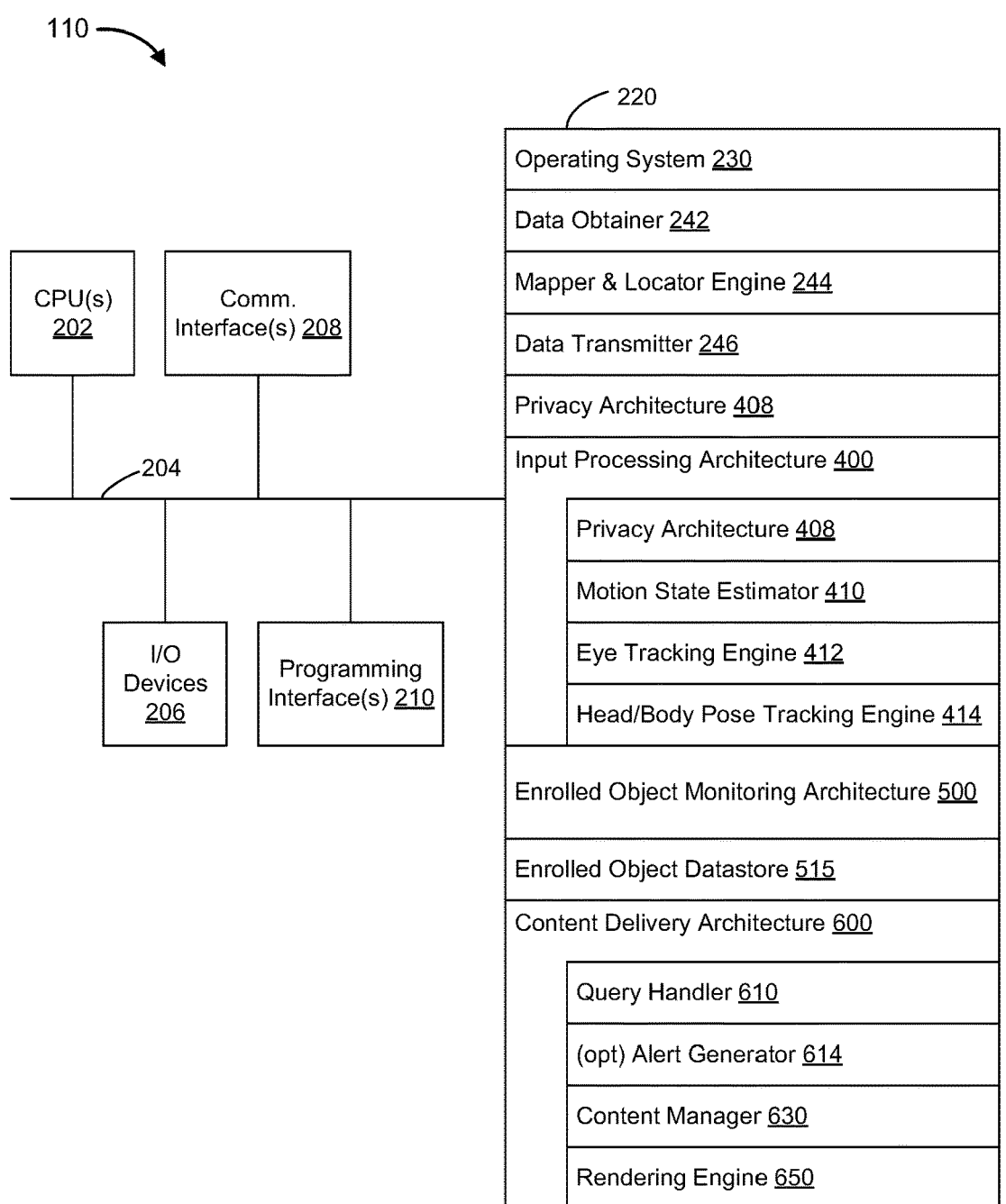
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

An operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, an input processing architecture 400 is configured to process local sensor data 403 and remote sensor data 405. The input processing architecture 400 is described in more detail below with reference to FIG. 4A. To that end, in various implementations, the input processing architecture 400 includes instructions and/or logic therefor, and heuristics and metadata therefor. According to some implementations, the input processing architecture 400 includes a privacy architecture 408, a motion state estimator 410, an eye tracking engine 412, and a head/body pose tracking engine 414.

In some implementations, the privacy architecture 408 is configured to ingest input data (e.g., the sensor data 403 and the remote sensor data 405) and filter user information and/or identifying information within the input data based on one or more privacy filters. The privacy architecture 408 is described in more detail below with reference to FIG. 4A. To that end, in various implementations, the privacy architecture 408 includes instructions and/or logic therefor, and heuristics and metadata therefor.

Figure 4A:
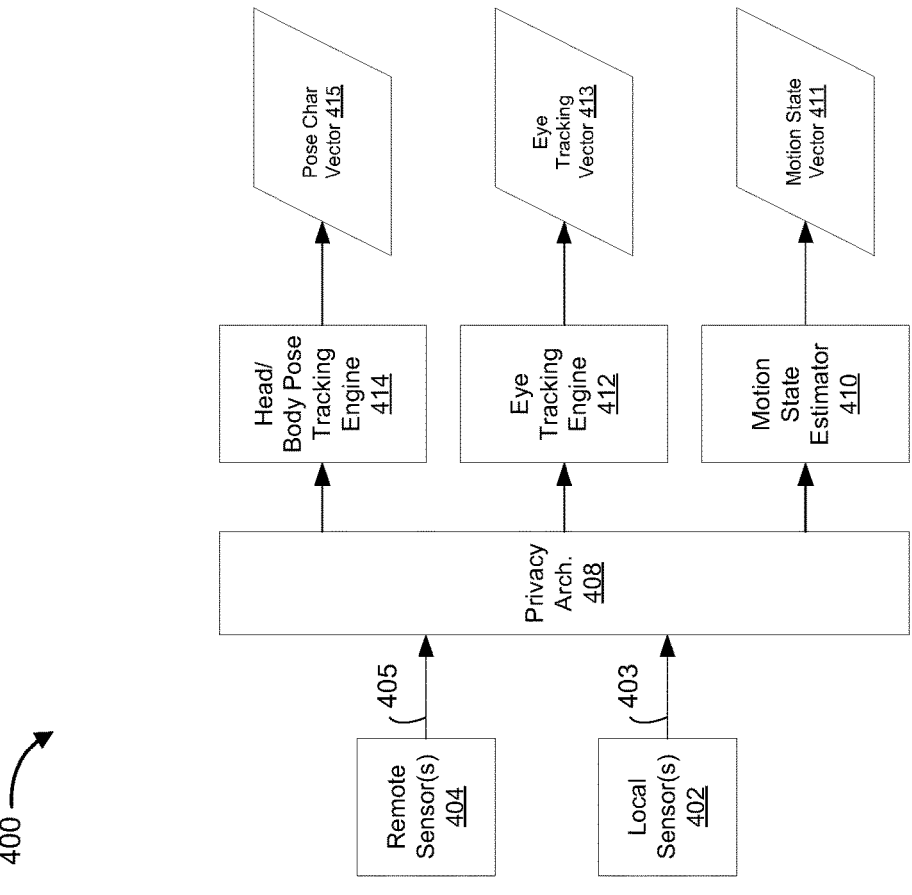
FIG. 4A is a block diagram of an example input processing architecture in accordance with some implementations.
Figure 4B:
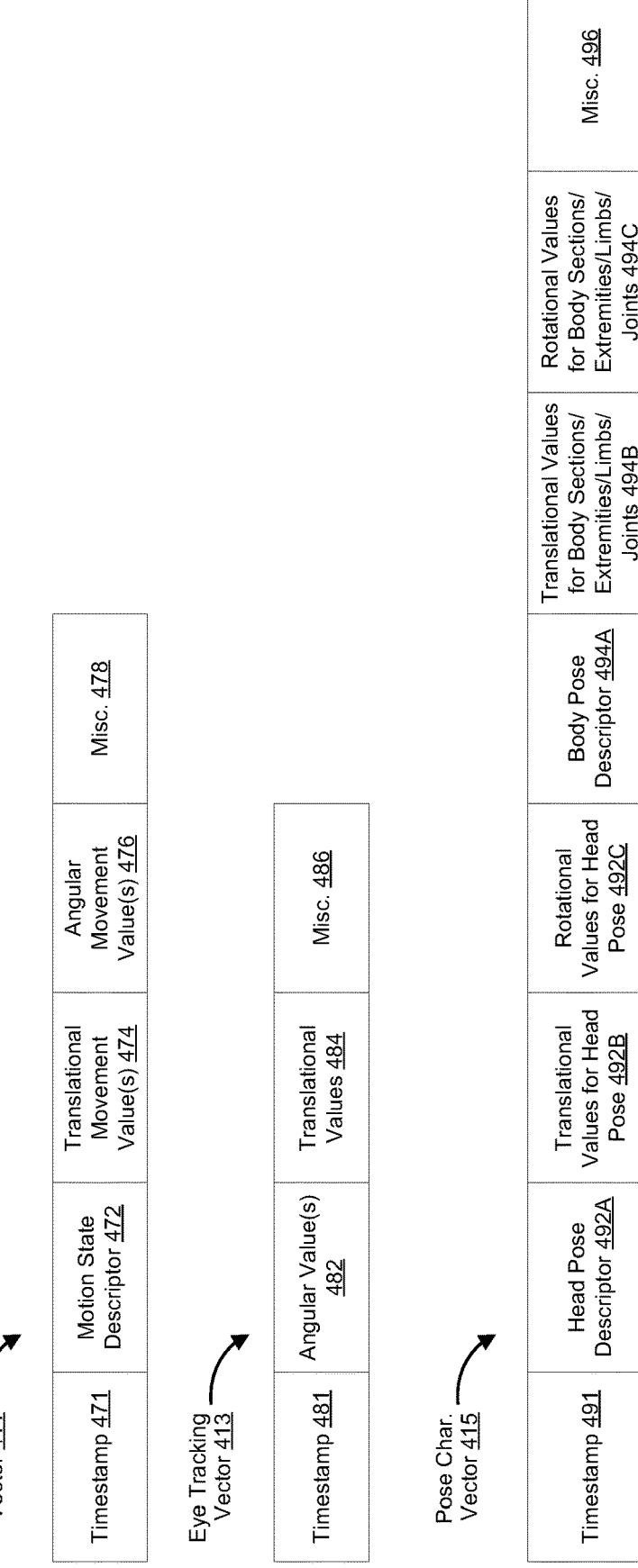
FIG. 4B illustrates data structures associated with the input processing architecture in FIG. 4A in accordance with some implementations.

In some implementations, the motion state estimator 410 is configured to obtain (e.g., receive, retrieve, or determine/generate) a motion state vector 411 as shown in FIG. 4B based on the input data and update the motion state vector 411 over time. The motion state estimator 410 is described in more detail below with reference to FIG. 4A. To that end, in various implementations, the motion state estimator 410 includes instructions and/or logic therefor, and heuristics and metadata therefor.

In some implementations, the eye tracking engine 412 is configured to obtain (e.g., receive, retrieve, or determine/ generate) an eye tracking vector 413 (sometimes also referred to herein as the "gaze vector 413") as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a ROI in the XR environment 128 at which the user 150 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, the head/body pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The head/body pose tracking engine 414 is described in more detail below with reference to FIG. 4A. To that end, in various implementations, the head/body pose tracking engine 414 includes instructions and/or logic therefor, and heuristics and metadata therefor. In some implementations, the eye tracking engine 412, and the head/body pose tracking engine 414 may be located on the electronic device 120 in addition to or in place of the controller 110.

In some implementations, an enrolled object monitoring architecture 500 is configured to monitor and track the location of enrolled objects. The enrolled object monitoring architecture 500 is described in more detail below with reference to FIG. 5A. To that end, in various implementations, the enrolled object monitoring architecture 500 includes instructions and/or logic therefor, and heuristics and metadata therefor.

In some implementations, an enrolled object datastore 515 stores a plurality of records for a plurality of enrolled objects. According to some implementations, the enrolled object datastore 515 is communicatively coupled to the controller 110, the electronic device 120, and/or a combination thereof. As one example, the enrolled object datastore 515 is located local to or remote from the controller 110. As another example, the enrolled object datastore 515 is located local to or remote from the electronic device 120. The enrolled object datastore 515 is described in more detail below with reference to FIG. 5B.

In some implementations, a content delivery architecture 600 is configured to render and present content. The content delivery architecture 600 is described in more detail below with reference to FIG. 6. To that end, in various implementations, the content delivery architecture 600 includes instructions and/or logic therefor, and heuristics and metadata therefor. According to some implementations, the content delivery architecture 600 includes a query handler 610, an optional alert generator 614, a content manager 630, and a rendering engine 650.

In some implementations, the optional alert generator 614 is configured to generate feedback (e.g., visual, audible, haptic, etc.) associated with the query obtained by the query handler 610. The alert generator 614 is described in more detail below with reference to FIG. 6. To that end, in various implementations, the alert generator 614 includes instructions and/or logic therefor, and heuristics and metadata therefor.

In some implementations, a content manager 630 is configured to manage and update the layout, setup, structure, and/or the like for the XR environment 128 including XR content, one or more user interface (UI) elements associated with the XR content, and/or the like. The content manager 630 is described in more detail below with reference to FIG. 6. To that end, in various implementations, the content manager 630) includes instructions and/or logic therefor, and heuristics and metadata therefor. In various implementations, the content manager 630 includes a frame buffer 634, a content updater 636, and a feedback engine 638.

In some implementations, a rendering engine 650 is configured to render an XR environment 128 (sometimes also referred to herein as a "graphical environment" or "virtual environment") or image frame associated therewith as well as the XR content, one or more UI elements associated with the XR content, and/or the like. The rendering engine 650) is described in more detail below with reference to FIG. 6. To that end, in various implementations, the rendering engine 650) includes instructions and/or logic therefor, and heuristics and metadata therefor. In various implementations, the rendering engine 450) includes a pose determiner 652, a renderer 654, an optional image processing architecture 662, and an optional compositor 664. One of ordinary skill in the art will appreciate that the optional image processing architecture 662 and the optional compositor 664 may be present for video pass-through configurations but may be removed for fully VR or optical see-through configurations.

Although the data obtainer 242, the mapper and locator engine 244, the data transmitter 246, the input processing architecture 400, the enrolled object monitoring architecture 500, and the content delivery architecture 600 are shown as residing on a single device (e.g., the controller 110), it should be understood that in other implementations, any combination of the data obtainer 242, the mapper and locator engine 244, the data transmitter 246, the input processing architecture 400, the enrolled object monitoring architecture 500, and the content delivery architecture 600 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
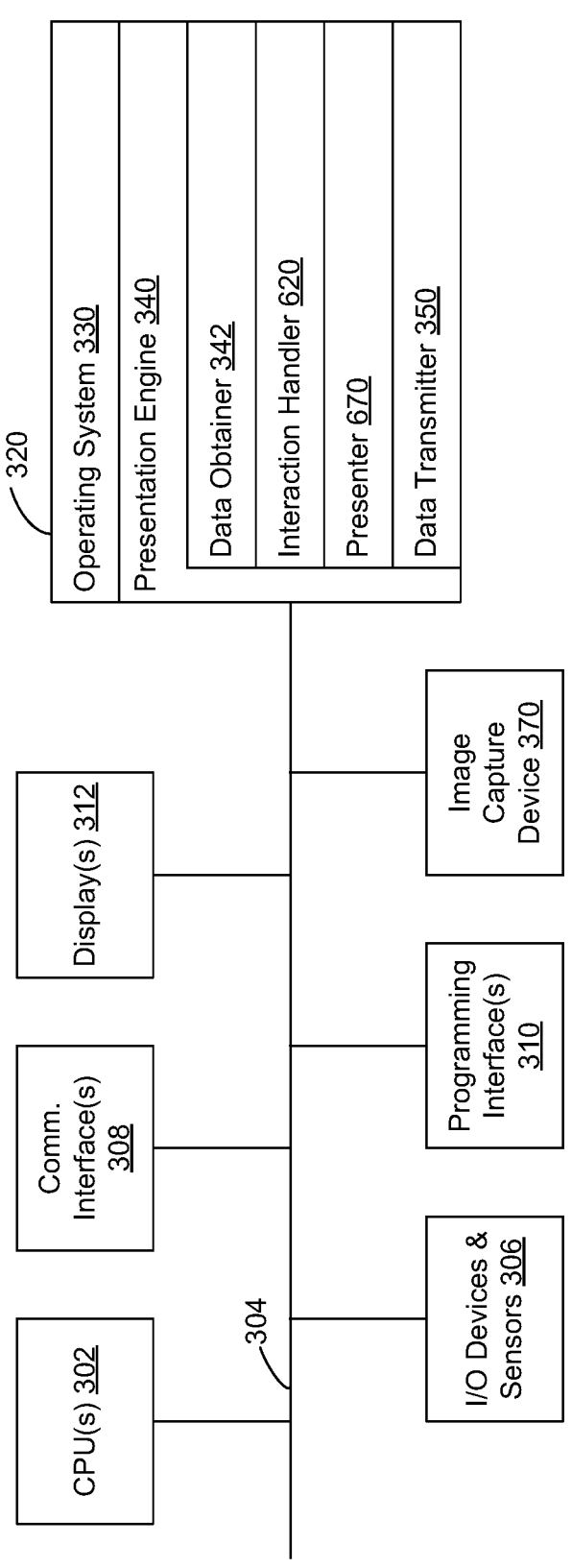
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a head/body pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 670, an interaction handler 620, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 620 is configured to detect user interactions with the presented A/V content and/or XR content (e.g., gestural inputs detected via hand/extremity tracking, eye gaze inputs detected via eye tracking, voice commands, etc.). To that end, in various implementations, the interaction handler 620 includes instructions and/or logic therefor, and heuristics and metadata therefor.

In some implementations, the presenter 670 is configured to present and update A/V content and/or XR content (e.g., the rendered image frames associated with the user interface or the XR environment 128 including the XR content, one or more UI elements associated with the XR content, and/or the like) via the one or more displays 312. To that end, in various implementations, the presenter 670 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 620, the presenter 670, and the data transmitter 350 are shown as residing on a single device (e.g., the electronic device 120), it should be understood that in other implementations, any combination of the data obtainer 342, the interaction handler 620, the presenter 670, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of an example input processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the input processing architecture 400 is included in a computing system with one or more processors and non-transitory memory such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes motion sensor data from one or more motion sensors (e.g., an inertial measurement unit (IMU), accelerometer, gyroscope, magnetometer, etc.), audio data from one or more microphones, biosensor data from one or more biosensors, images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes motion sensor data from one or more motion sensors (e.g., an IMU, accelerometer, gyroscope, magnetometer, etc.), audio data from one or more microphones, biosensor data from one or more biosensors, images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the input processing architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the input processing architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the motion state estimator 410 obtains the local sensor data 403 and the remote sensor data 505 after it has been subjected to the privacy architecture 408. In some implementations, the motion state estimator 410 obtains (e.g., receives, retrieves, or determines/generates) a motion state vector 411 based on the input data and updates the motion state vector 411 over time.

FIG. 4B shows an example data structure for the motion state vector 411 in accordance with some implementations. As shown in FIG. 4B, the motion state vector 411 may correspond to an N-tuple characterization vector or characterization tensor that includes a timestamp 471 (e.g., the most recent time the motion state vector 411 was updated), a motion state descriptor 472 for the electronic device 120 (e.g., stationary, in-motion, car, boat, bus, train, plane, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or miscellaneous information 478. One of ordinary skill in the art will appreciate that the data structure for the motion vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 (sometimes also referred to herein as the "gaze vector 413") based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the head/body pose tracking engine 414 obtains the local sensor data 403 and the remote sensor data 405 after it has been subjected to the privacy architecture 408. In some implementations, the head/body pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations.

Figure 5A:
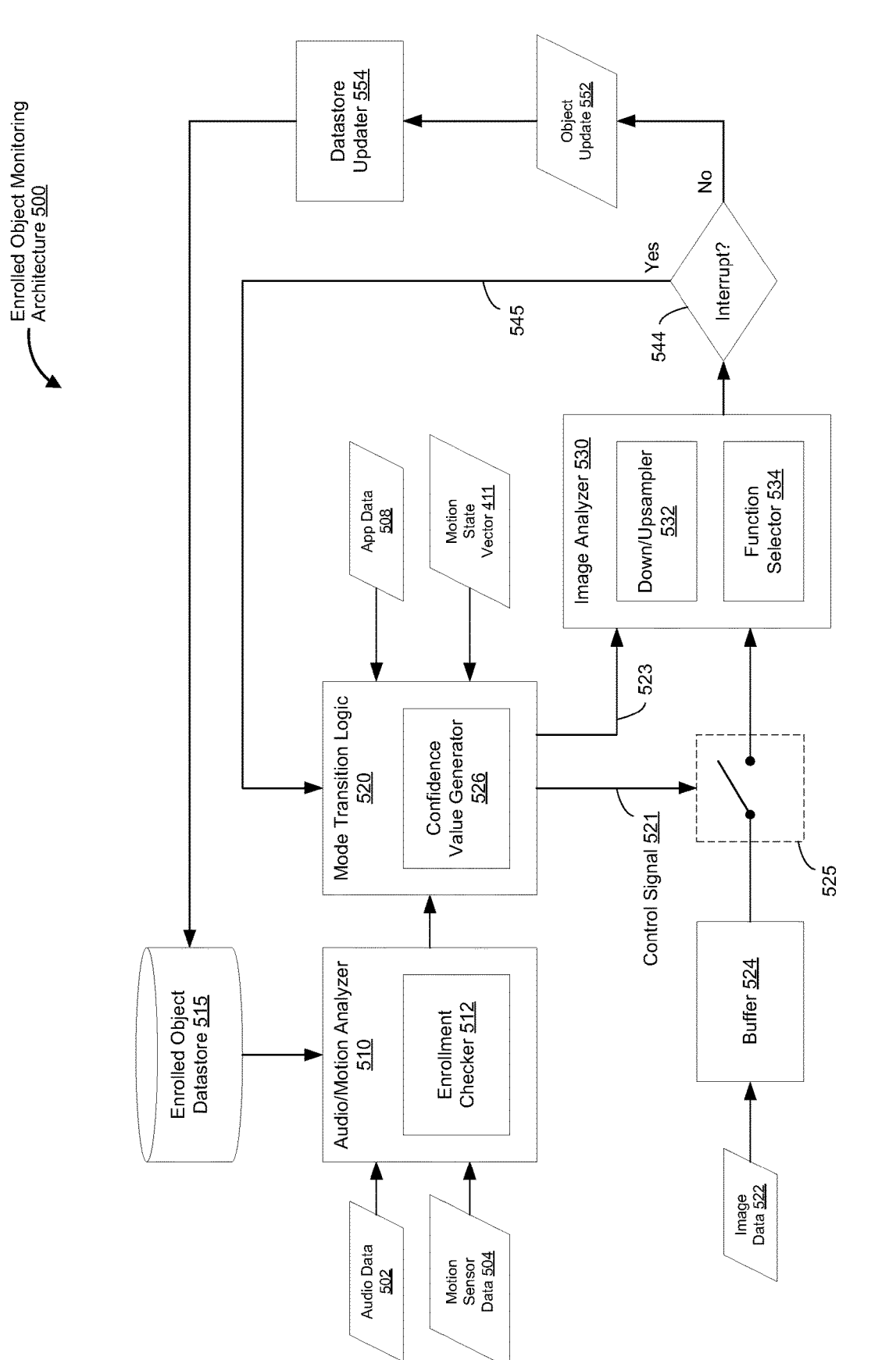
FIG. 5A is a block diagram of an example enrolled object monitoring architecture in accordance with some implementations.

FIG. 5A is a block diagram of an example enrolled object monitoring architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the enrolled object monitoring architecture 500 is included in a computing system with one more processors and non-transitory memory such as the controller 110 shown in FIGS. 1 and 2; the electronic device 120 shown in FIGS. 1 and 3; and/or a suitable combination thereof.

As shown in FIG. 5A, an audio/motion analyzer 510 obtains (e.g., receives, retrieves, generates, captures, etc.) audio data 502 and/or motion sensor data 504. For example, the audio data 502 corresponds to ambient audio information captured by one or more microphones of the computing system and/or remote devices within the physical environment 105. As one example, the motion sensor data 504 corresponds to the pose characterization vector 415 that includes head pose information and/or body pose information associated with the user 150 of the computing system. As another example, the motion sensor data 504 corresponds to motion sensor data from a wearable device, such as a finger-worn device or a wrist-worn device, that is communicatively coupled with the computing system.

In FIG. 5A, the audio/motion analyzer 510 determines whether the audio data 502 and/or the motion sensor 504 data satisfies a mode transition criterion. As one example, the audio data 502 satisfies the mode transition criterion when the audio data 502 matches an audio signature associated with an enrolled object within a tolerance/variance threshold. In this example, the enrollment checker 512 attempts to match the audio data 502 to an audio signature within the enrolled object datastore 515 that corresponds to an enrolled object within the variance/tolerance threshold (e.g., determine whether the audio data 502 corresponds to a water bottle being moved on a table and thus the audio data 502 corresponds to an enrolled water bottle object). For example, the variance/tolerance threshold corresponds to a deterministic or non-deterministic value that enables a small degree of deviation from the stored audio signature for the enrolled object.

As shown in FIG. 5B, the enrolled object datastore 515 includes a plurality of records 517A, 517B, . . . , 517N for a plurality of enrolled objects. One of ordinary skill in the art will appreciate that the records 517A, 517B, . . . , 517N are example data structures that may be modified or structured in myriad ways in various other implementations. For example, the record 517A corresponds to a first enrolled object among the plurality of enrolled objects. Continuing with this example, the record 517A includes an enrolled object identifier 519A for the first enrolled object, a semantic label 519B for the first enrolled object, an audio signature 519C for the first enrolled object, a most recent location 519D for the first enrolled object and the corresponding time/date, one or more past locations 519E for the first enrolled object and corresponding times/dates, and miscellaneous information 519F associated with the first enrolled object. Continuing with this example, the record 517A may further include appearance information for the first enrolled object (e.g., geometric information associated with the shape and/or dimensions of the first enrolled object, color information associated with the first enrolled object, texture information associated with the first enrolled object, and/or the like), a probability value or the like associated with the likelihood that the first enrolled object will move, and/or the like. As one example, if the first enrolled object corresponds to a cup, the probability that the cup will move is high relative to a stationary object such as a table. In this example, the computing system is more likely to enter modes 580B or 580C described below with reference to FIG. 5B to track the cup as opposed the table because the table is not as likely to move as the cup.

According to some implementations, during an object enrollment process, the computing system creates a record for a respective object within the enrolled object datastore 515 based on information provided by the user 150, crowd-sourced information, and/or information collected by the computing system. For example, the user 150 may enroll or disenroll objects as desired. As one example, the computing system may guide the user through the enrollment process by prompting the user to rotate the respective object to capture various views/orientations of the respective object. Continuing with this example, the computing system may also prompt the user to produce noises with the respective object by translating the respective object relative to a surface such as a table, shaking the respective object, picking up and placing down the respective object, and/or the like to generate the audio signature associated with the respective object.

As another example, the motion sensor data 504 satisfies the mode transition criterion when the motion sensor data 504 indicates that an enrolled object is within the current FOV based on the current head/body pose information and the most recent location/time for the enrolled object. In this example, the audio/motion analyzer 510 determines a current field-of-view (FOV) relative to the physical environment 105 based on at least one of the head pose information and the body pose information. Continuing with this example, the enrollment checker 512 determines whether the current FOV includes an enrolled object based on the most recent locations of enrolled objects from the enrolled object datastore 515, the current location of the user 150, and a map, point cloud, etc. of the physical environment 105.

As yet another example, the motion sensor data 504 satisfies the mode transition criterion when the motion sensor data 504 indicates that the user 150 is interacting with an enrolled object based on motion sensor data from a wearable device such as a finger-worn device or a wrist-worn device. In this example, the enrollment checker 512 determines whether motion sensor data 504 indicates a user interaction with an enrolled object based on the most recent locations of enrolled objects from the enrolled object datastore 515, the current location of the user 150, the location of the wearable device, and a map, point cloud, etc. of the physical environment 105.

As yet another example, the motion sensor data 504 satisfies the mode transition criterion when the motion sensor data 504 indicates that an enrolled object is being moved away from a most recent location for the enrolled object based on motion sensor data from a wearable device such as a finger-worn device or a wrist-worn device. In this example, the enrollment checker 512 determines whether motion sensor data 504 indicates movement of an enrolled object based on the most recent locations of enrolled objects from the enrolled object datastore 515, the current location of the user 150, the location of the wearable device, and a map, point cloud, etc. of the physical environment 105.

In FIG. 5A, the mode transition logic 520 obtains an indication from the audio/motion analyzer 510 that the audio data 502 and/or the motion sensor data 504 satisfies the mode transition criterion. The mode transition logic 520 may also determine whether biosensor data from one or more biosensors communicatively coupled with the computing system satisfies the mode transition criterion. According to some implementations, the confidence value generator 526 generates one or more confidence values 523 associated with the satisfaction of the mode transition criterion.

In FIG. 5A, the mode transition logic 520 also determines whether contextual information, such as the motion state vector 411 and/or application data 508 (e.g., information associated with foreground and/or background applications/programs being executed by the computing system), satisfies the mode transition criterion. In some implementations, the application data 508 satisfies the mode transition criterion when a change from a first application to a second application occurs such as transition from a productivity application to an entertainment application or the like. In some implementations, the motion state vector 411 satisfies the mode transition criterion when change from a first motion state to a second motion state relative to the user 150 of the computing system occurs such as transition from sitting to standing, sitting to walking, or the like.

As shown in FIG. 5A, a buffer 524 stores image data 522 captured by one or more image sensors of the computing system (e.g., scene cameras) or by one or more image sensors of a remote device communicatively coupled with the computing system. While operating in the first mode (e.g., a low power mode), the computing system monitors the audio data 502 and/or the motion sensor data but not the image 522 because a controllable switch 525 is an open state.

In response to obtaining the indication that the audio data 502 and/or the motion sensor data 504 satisfies the mode transition criterion and/or determining that the contextual information satisfies the mode transition criterion, the mode transition logic 520 transitions the computing system from the first mode to a second mode by transmitting a control signal 521 to close the controllable switch 525 in order to allow the image data 522 to flow from the buffer 524 to the image analyzer 530. In response to obtaining the indication that the audio data 502 and/or the motion sensor data 504 satisfies the mode transition criterion and/or determining that the contextual information satisfies the mode transition criterion, the mode transition logic 520 also transmits the one or more confidence values 523 to the image analyzer 530.

According to some implementations, the image analyzer 530 selects an image frame ingestion rate based on the one or more confidence values 523. As one example, the image analyzer 530 or a component thereof (e.g., the down/upsampler 532) selects a first image frame ingestion rate (e.g., 60 fps) when the one or more confidence values associated with the satisfaction of the mode transition criterion are low. As another example, the image analyzer 530 or a component thereof (e.g., the down/upsampler 532) selects a second image frame ingestion rate greater than the first image frame ingestion rate (e.g., 90 fps) when the one or more confidence values associated with the satisfaction of the mode transition criterion are high. As such, if the one or more confidence values 523 associated with the determination that the audio data and/or the motion sensor data satisfy the motion state criterion are high, the image analyzer 530 selects second the second image frame ingestion rate greater than the first image frame ingestion rate in order to update the record for the enrolled object with higher accuracy.

According to some implementations, the image analyzer 530 selects a set of one or more image processing functions based on the one or more confidence values 523 (e.g., one or more of an object recognition/classification function, a semantic segmentation function, a localization function, and/or the like). As one example, the image analyzer 530 or a component thereof (e.g., the function selector 534) selects a first set of one or more image processing functions (e.g., the localization function) when the one or more confidence values associated with the satisfaction of the mode transition criterion are low. As another example, the image analyzer 530 or a component thereof (e.g., the function selector 534) selects a second set of one or more image processing functions (e.g., the object recognition/classification, semantic segmentation, and localization functions) when the one or more confidence values associated with the satisfaction of the mode transition criterion are high. As such, if the one or more confidence values 523 associated with the determination that the audio data and/or the motion sensor data satisfy the motion state criterion are high, the image analyzer 530 selects the second set of one or more image processing functions in order to update the record for the enrolled object with higher accuracy.

According to some implementations, the image analyzer 530 obtains one or more image frames of the physical environment 105 based on the selected image frame ingestion rate, determines a current location for an enrolled object by performing the selected set of one or more image processing functions on the one or more image frames, and generates an object update payload 552 in order to update the record within the enrolled object datastore 515 for the enrolled object with the current location.

As one example, the image analyzer 530 prioritizes the ingestion of image frames from remote image sensors over image frames from local image sensors (e.g., the image capture device 370 (scene cameras) of the electronic device 120) in order to maintain the local image sensors in the inactive state to conserve power. In this example, the image analyzer 530 may ingest frames from the local image sensors when the image frames from remote image sensors do not enable accurate localization of the enrolled object.

As shown in FIG. 5A, the enrolled object monitoring architecture 500 determines (544) whether an interrupt criterion is satisfied. In some implementations, the interrupt criterion is satisfied when the image analyzer 530 has run for X seconds, when the image analyzer 520 has processed Y image frames from the buffer 524, or when the image analyzer has generated Z object update payloads. In FIG. 5A, if the interrupt criterion is satisfied ("Yes" branch), the enrolled object monitoring architecture 500 transmits a mode transition signal 545 to the mode transition logic 520 to transition from the second mode to the first mode. In FIG. 5A, if the timeout interrupt is not satisfied ("No" branch), the object update payload 552 is provided to a datastore updater 554. In some implementations, the datastore updater 554 updates the record within the enrolled object datastore 515 for the enrolled object with the current location and time/date included within the object update payload 552.

FIG. 5B illustrates an enrolled object monitoring continuum 575 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the enrolled object monitoring continuum 575 includes modes 580A, 580B, and 580C arranged from lowest power/resource consumption to most power/resource consumption, respectively.

According to some implementations, the mode 580A corresponds to the first mode (e.g., low power mode) described above with reference to FIG. 5A, where the audio/motion analyzer 510 processes the audio data 502 and/or the motion sensor date 504, and the controllable switch 525 is open. In some implementations, the mode 580B corresponds to the second mode (e.g., a medium power mode with limited image analysis and/or a first image frame ingestion rate) described above with reference to FIG. 5A, where the controllable switch 525 is closed, and the image analyzer 530 processes the image data 522 from the buffer 524 based on a first image frame ingestion rate (e.g., 60 fps) and a first set of one or more image processing functions. In some implementations, the mode 580C corresponds to the second mode (e.g., a high power mode with full image analysis and/or a second image frame ingestion rate greater than the image frame ingestion rate) described above with reference to FIG. 5A, where the controllable switch 525 is closed, and the image analyzer 530 processes the image data 522 from the buffer 524 based on a second image frame ingestion rate (e.g., 90 fps) and a second set of one or more image processing functions.

Figure 6:
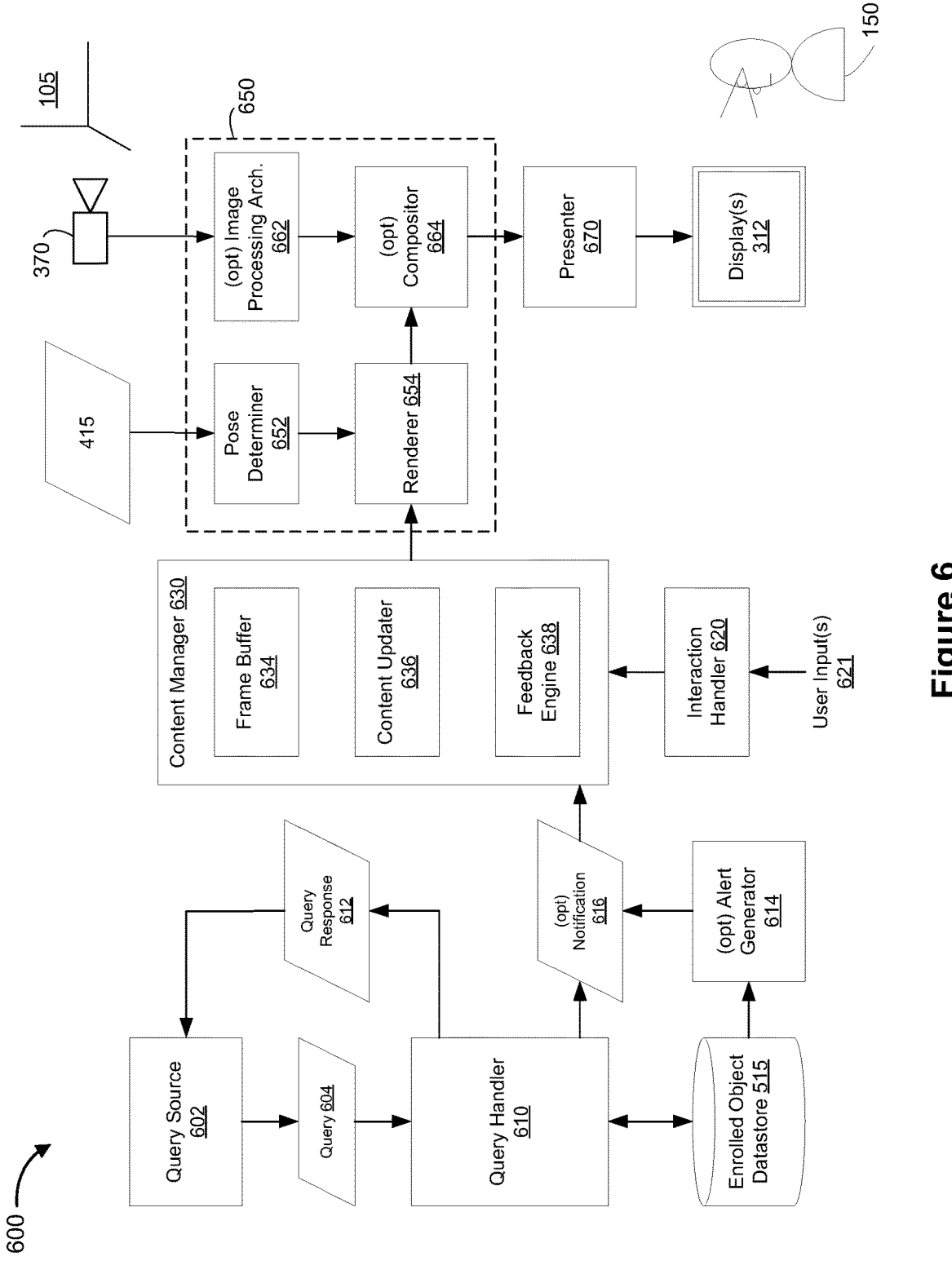
FIG. 6 is a block diagram of an example content delivery architecture in accordance with some implementations.

FIG. 6 is a block diagram of an example content delivery architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 600 is included in a computing system with one more processors and non-transitory memory such as the controller 110 shown in FIGS. 1 and 2; the electronic device 120 shown in FIGS. 1 and 3; and/or a suitable combination thereof.

As shown in FIG. 6, a query source 602 provides a query 604 associated with an enrolled object. As one example, the query source 602 corresponds to the user 150, and the query 604 corresponds to an alphanumeric input string, a voice input, or the like. As another example, the query source 602 corresponds to an application or program, a periodic monitoring routine, a constant monitoring routine, or the like, and the query 604 corresponds to an alphanumeric input string or the like (e.g., the enrolled object identifier).

In FIG. 6, the query handler 610 obtains (e.g., receives, retrieves, etc.) the query 604 from the query source 602. As shown in FIG. 6, the query handler 610 determines/generates a query response 612 by performing a lookup against the enrolled object datastore 515 based on the query 604. As one example, if the query 604 corresponds to a proactive location query (e.g., "Where is my umbrella?), the query handler 610 obtains the current location for the umbrella (e.g., the enrolled object) by performing a lookup for the umbrella within the enrolled object datastore 515 and provides the current location for the umbrella as a query response 612 to the query source 602.

In some implementations, the query handler 610 may generate an optional notification 616 representing the query response 612. In some implementations, the optional alert generator 614 may generate an optional notification 616 whenever a current location within the enrolled object datastore 515 is changed for an enrolled object.

According to some implementations, the interaction handler 620 obtains (e.g., receives, retrieves, or detects) one or more user inputs 621 provided by the user 150 that are associated with selecting A/V content, one or more VAs, and/or XR content for presentation. For example, the one or more user inputs 621 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like.

In various implementations, the content manager 630 manages and updates the layout, setup, structure, and/or the like for the user interface or the XR environment 128, including the XR content, one or more UI elements associated with the XR content, and/or the like, based on the notification 616, the one or more user inputs 621, and/or the like. To that end, the content manager 630 includes the frame buffer 634, the content updater 636, and the feedback engine 638.

In some implementations, the frame buffer 634 includes XR content, a rendered image frame, and/or the like for one or more past instances and/or frames. In some implementations, the content updater 636 modifies the XR environment 128 over time based on the user inputs 621 associated with modifying and/or manipulating the UI or the XR content, translational or rotational movement of objects within the physical environment 105, translational or rotational movement of the electronic device 120 (or the user 150), and/or the like. In some implementations, the feedback engine 638 generates sensory feedback (e.g., visual feedback such as text or lighting changes, audio feedback, haptic feedback, etc.) associated with the XR environment 128.

According to some implementations, the pose determiner 652 determines a current camera pose of the electronic device 120 and/or the user 150 relative to the XR environment 128 and/or the physical environment 105 based at least in part on the pose characterization vector 415. In some implementations, the renderer 654 renders the XR content, one or more UI elements associated with the XR content, and/or the like according to the current camera pose relative thereto.

According to some implementations, the optional image processing architecture 662 obtains an image stream from an image capture device 370 including one or more images of the physical environment 105 from the current camera pose of the electronic device 120 and/or the user 150. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered XR content with the processed image stream of the physical environment 105 from the image processing architecture 662 to produce rendered image frames of the XR environment 128. In various implementations, the presenter 670 presents the rendered image frames of the XR environment 128 to the user 150 via the one or more displays 312. One of ordinary skill in the art will appreciate that the optional image processing architecture 662 and the optional compositor 664 may not be applicable for fully virtual environments (or optical see-through scenarios).

FIGS. 7A and 7B illustrate a flowchart representation of a method 700 of context-based mode transitions for object tracking in accordance with some implementations. In various implementations, the method 700 is performed at a computing system including non-transitory memory and one or more processors, wherein the computing system is communicatively coupled to an optional display device, one or more microphones, one or more image sensors, and one or more motion sensors (e.g., the electronic device 120 shown in FIGS. 1 and 3; the controller 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, a computing system may enroll and track physical objects of interest. As one example, a scene camera may continuously capture images of a physical environment to track enrolled objects therein. In this example, the captured images are subsequently analyzed in order to recognize enrolled objects and determine their current locations for tracking purposes. However, constant analysis of these images may consume significant power and computing resources. In contrast, the methods described herein enable transitions between various tracking modes for enrolled objects such as a first mode (e.g., low power consumption mode) where audio and motion sensor data are analyzed but images are not, a second mode (e.g., medium power consumption mode) where images from a scene camera are ingested at a first image ingestion rate (e.g., 60 fps) and a first set of image processing operations (e.g., localization) are performed on the images, and a third mode (e.g., high power consumption mode) where images the scene camera are ingested at a second image ingestion rate (e.g., 90 fps) greater than the first image ingestion rate and a second set of image processing operations (e.g., object recognition/classification, semantic segmentation, and localization) are performed on the images.

As represented by block 702, while operating the computing system according to a first mode, the method 700 includes obtaining (e.g., receiving, retrieving, capturing, generating, determining, etc.) audio data associated with a physical environment via the one or more microphones and motion sensor data via the one or more motion sensors. According to some implementations, as represented by block 704, the one or more microphones and the one or more motion sensors are active in the first mode, and the one or more image sensors are inactive in the first mode.

As one example, with reference to FIG. 5A, the computing system or a component thereof (e.g., the audio/motion analyzer 510) obtains (e.g., receives, retrieves, generates, captures, etc.) audio data 502 and/or motion sensor data 504. For example, the audio data 502 corresponds to ambient audio information captured by one or more microphones of the computing system and/or remote devices within the physical environment 105. As one example, the motion sensor data 504 corresponds to the pose characterization vector 415 that includes head pose information and/or body pose information associated with the user 150 of the computing system. As another example, the motion sensor data 504 corresponds to motion sensor data from a wearable device, such as a finger-worn device or a wrist-worn device, that is communicatively coupled with the computing system.

In some implementations, the motion sensors correspond to at least one of an inertial measurement unit (IMU), an accelerometer, a gyroscope, a magnetometer, and/or the like. As one example, the one or more motion sensors are integrated with a head-mounted device (HMD), wherein the HMD corresponds to the computing system. As another example, the one or more motion sensors are integrated with the HMD, wherein the computing system is communicatively coupled to the HMD via a wired to wireless communication channel.

As one example, the motion sensors are integrated with a wearable device, and the wearable device corresponds to the computing system. As another example, the motion sensors are integrated with a wearable device, and the computing system is communicatively coupled to the wearable device via a wired to wireless communication channel.

As one example, the one or more microphones are integrated with the computing system. As another example, the one or more microphones are separate from and communicatively coupled to the computing system.

As one example, the one or more image sensors (e.g., RGB scene cameras) are integrated with the computing system. As another example, the one or more image sensors (e.g., RGB scene cameras) are separate from and communicatively coupled to the computing system.

As represented by block 706, the method 700 includes determining whether at least one of the audio data and the motion sensor data satisfies a mode transition criterion. As one example, with reference to FIG. 5A, the computing system or a component thereof (e.g., the audio/motion analyzer 510) determines whether the audio data 502 and/or the motion sensor 504 data satisfies a mode transition criterion. As one example, the audio data 502 satisfies the mode transition criterion when the audio data 502 matches an audio signature associated with an enrolled object within a tolerance/variance threshold. In this example, the enrollment checker 512 attempts to match the audio data 502 to an audio signature within the enrolled object datastore 515 that corresponds to an enrolled object within the variance/tolerance threshold. For example, the variance/tolerance threshold corresponds to a deterministic or non-deterministic value that enables a small degree of deviation from the stored audio signature for the enrolled object.

In some implementations, the motion sensor data satisfies the mode transition criterion when the motion sensor data indicates that an enrolled object is within the current FOV based on current head/body pose information and the most recent location/time for the enrolled object. In some implementations, the motion sensor data satisfies the mode transition criterion when the motion sensor data indicates that the user is interacting with an enrolled object based on motion sensor data from a wearable device or the like.

In various implementations, the one or more motion sensors are integrated with a wearable device, and wherein the motion sensor data satisfies the mode transition criterion when the motion sensor data indicates that the user is interacting with an enrolled object based on motion sensor data from the wearable device. According to some implementations, the motion sensor data satisfies the mode transition criterion when the motion sensor data indicates that an enrolled object is being moved away from a most recent location for the enrolled object based on motion sensor data from a wearable device or the like. For example, the wearable device corresponds to a finger-worn device or a wrist-worn device.

In various implementations, the motion sensor data includes at least one of head pose information and body pose information associated with a user of the computing system, and the method further comprising determining a current field-of-view (FOV) relative to the physical environment based on at least one of the head pose information and the body pose information, wherein the motion sensor data satisfies the mode transition criterion when the motion sensor data indicates that an enrolled object is within the FOV based on a most recent location for the enrolled object.

In various implementations, the computing system is further communicatively coupled to one or more biosensors. In some implementations, the method 700 includes obtaining biosensor data associated with a user of the computing system via the one or more biosensors, wherein the biosensor data satisfies the mode transition criterion when the biosensor data indicates that the user is interacting with the enrolled object. For example, one or more biosensors include at least one of a blood oximetry sensor, a blood glucose sensor, a blood pressure sensor, a heart rate sensor, a breathing rate sensor, a temperature sensor, and the like.

In some implementations, the method 700 includes obtaining (e.g., receiving, retrieving, generating, etc.) the most recent location for the enrolled object from an enrolled object datastore (e.g., the enrolled object datastore 515 in FIGS. 5A and 5B), wherein the enrolled object datastore includes a plurality of records for each of a plurality of enrolled objects. For example, the user may enroll/disenroll objects for an object monitoring/tracking regime. In some implementations, during the enrollment process, the computing system creates a record for the candidate object within the enrolled object datastore, wherein the record includes an audio signature for the candidate object based on an audio sample and a current location for the candidate object based on images of the physical environment that include the candidate object and a map, point cloud etc. for the physical environment.

In some implementations, the computing system accesses the enrolled object datastore 515 associated with a plurality of enrolled objects as shown in FIGS. 5A and 5B (e.g., local or remote relative to the computing system). As shown in FIG. 5B, the enrolled object datastore 515 includes a plurality of records 517A, 517B, . . . , 517N for a plurality of enrolled objects. With further reference to FIG. 5B, the record 517A corresponds to a first enrolled object among the plurality of enrolled objects. Continuing with this example, the record 517A includes an enrolled object identifier 519A for the first enrolled object, a semantic label 519B for the first enrolled object, an audio signature 519C for the first enrolled object, a most recent location 519D for the first enrolled object and the corresponding time/date, one or more past locations 519E for the first enrolled object and corresponding times/dates, and miscellaneous information 519F associated with the first enrolled object.

As represented by block 708, in response to determining that at least one of the audio data and the motion sensor data satisfies the mode transition criterion, the method 700 includes transitioning the computing system from the first mode to a second mode. As one example, with reference to FIG. 5A, in response to determining that at least one of the audio data 502 and the motion sensor data 504 satisfies the mode transition criterion, the computing system or a component thereof (e.g., the mode transition logic 520) transitions the computing system from the first mode to a second mode by transmitting a control signal 521 to close the controllable switch 525 in order to allow the image data 522 to flow from the buffer 524 to the image analyzer 530.

In some implementations, the computing system operates in the first mode (e.g., a low power mode without image analysis) until determining that the user is interacting with or intends to interact with an enrolled object, at which point the computing system may transition to a second mode (e.g., a medium power mode with limited image analysis and/or a first image frame ingestion rate) or a third mode (e.g., a high power mode with full image analysis and/or a second image frame ingestion rate greater than the first image frame ingestion rate) to confirm the presence of the enrolled object and update its most recent location/time in the enrolled object datastore.

According to some implementations, as represented by block 714, in response to determining that the audio data and the motion sensor data do not satisfy the mode transition criterion, the method 700 includes maintaining operation of the computing system in the first mode. As one example, with reference to FIG. 5A, the computing system or a component thereof (e.g., the mode transition logic 520) maintains operation of the computing system in the first mode when neither the audio data 502 nor the motion sensor data 504 satisfies the mode transition criterion.

According to some implementations, as represented by block 716, the method 700 includes: detecting a change from a first motion state to a second motion state relative to a user of the computing system; in response to detecting the change from the first motion state to the second motion state, determining whether the change from the first motion state to the second motion state satisfies a mode transition criterion; and in response to determining that the change from the first motion state to the second motion state satisfies the mode transition criterion, transitioning the computing system from the first mode to the second mode. In some implementations, apart from the state of the audio data and/or the motion sensor data, the computing system may also transition from the first mode to the second mode in response to detecting a motion state change such as transition from sitting to standing, sitting to walking, and/or the like. As one example, with reference to FIG. 5A, the computing system or a component thereof (e.g., the mode transition logic 520) determines whether contextual information (e.g., the motion state vector 411 and/or the application data 508 in FIG. 5A) satisfies the mode transition criterion. In some implementations, the motion state vector 411 satisfies the mode transition criterion when change from a first motion state to a second motion state relative to the user 150 of the computing system occurs such as transition from sitting to standing, sitting to walking, or the like.

According to some implementations, as represented by block 718, the method 700 includes: detecting a change from a first application to a second application; in response to detecting the change from the first application to the second application, determining whether the change from the first application to the second application satisfies a mode transition criterion; and in response to determining that the change from the change from the first application to the second application satisfies the mode transition criterion, transitioning the computing system from the first mode to the second mode. In some implementations, apart from the state of the audio data and/or the motion sensor data, the computing system may also transition from the first mode to the second mode in response to detecting a change in the application such as transition from a productivity application to an entertainment application and/or the like. As one example, with reference to FIG. 5A, the computing system or a component thereof (e.g., the mode transition logic 520) determines whether contextual information (e.g., the motion state vector 411 and/or the application data 508 in FIG. 5A) satisfies the mode transition criterion. In some implementations, the application data 508 satisfies the mode transition criterion when a change from a first application to a second application occurs such as transition from a productivity application to an entertainment application, or the like.

As represented by block 710, while operating the computing system according to the second mode, the method 700 includes: obtaining one or more image frames of the physical environment based on an image frame ingestion rate via the one or more image sensors; determining a current location for an enrolled object by performing a set of one or more image processing functions on the one or more image frames; and updating a record for the enrolled object to include the current location. According to some implementations, as represented by block 712, the one or more image sensors are active in the second mode, and the one or more microphones and the one or more motion sensors are inactive in the second mode. For example, the first set of one or more image processing functions includes at least one of an object recognition/classification function, a semantic segmentation function, and an object localization function relative to a known map, point cloud, etc. for the physical environment. Continuing with this example, the computing system performs the first set of one or more image processing functions to determine the current location for the enrolled object.

For example, with reference to FIG. 5A, the computing system or a component thereof (e.g., the image analyzer 530) obtains the image data 522 from the buffer 524 based on the selected image frame ingestion rate, determines a current location for an enrolled object by performing the selected set of one or more image processing functions on the one or more image frames, and generates an object update payload 552 in order to update the record within the enrolled object datastore 515 for the enrolled object with the current location.

Continuing with the example above, with further reference to FIG. 5A, the computing system or a component thereof (e.g., the datastore updater 554) updates the record within the enrolled object datastore 515 for the enrolled object with the current location and time/date included within the object update payload 552. In some implementations, updating the record for the enrolled object to include the current location includes updating the record stored within an enrolled object datastore, wherein the enrolled object datastore includes a plurality of records for a plurality of enrolled objects including the enrolled object. In some implementations, the enrolled object datastore is stored locally or remotely relative to the computing system.

According to some implementations, the method 700 includes: selecting the image frame ingestion rate based on a confidence value associated with the satisfaction of the mode transition criterion, wherein the selected image frame ingestion rate corresponds to one of a first image frame ingestion rate or a second image frame ingestion rate greater than the first image frame ingestion rate. As one example, with reference to FIG. 5A, the computing system or a component thereof (e.g., the confidence value generator 526) generates one or more confidence values 523 associated with the satisfaction of the mode transition criterion. With further reference to FIG. 5A, the computing system or a component thereof (e.g., the down/upsampler 532) selects the image frame ingestion rate based on the one or more confidence values 523. As one example, the image analyzer 530 or a component thereof (e.g., the down/upsampler 532) selects a first image frame ingestion rate (e.g., 60 fps) when the one or more confidence values associated with the satisfaction of the mode transition criterion are low. As another example, the image analyzer 530) or a component thereof (e.g., the down/upsampler 532) selects a second image frame ingestion rate greater than the first image frame ingestion rate (e.g., 90 fps) when the one or more confidence values associated with the satisfaction of the mode transition criterion are high.

In some implementations, the selectable image frame ingestion rates correspond to deterministic or non-deterministic values such as 30 fps, 60 fps, 90 fps, or the like. In some implementations, the computing system may select the first image frame ingestion rate when the one or more confidence values associated with the satisfaction of the mode transition criterion are low. In some implementations, the computing system may select the second image frame ingestion rate when the one or more confidence values associated with the satisfaction of the mode transition criterion are high.

According to some implementations, the method 700 includes: selecting the set of one or more image processing functions based on a confidence value associated with the satisfaction of the mode transition criterion, wherein the set of one or more image processing functions corresponds to one of a first set of one or more image processing functions or a second set of one or more image processing functions greater than the first set of one or more image processing functions. In some implementations, selecting the set of one or more image processing functions is based on a confidence value associated with the satisfaction of the mode transition criterion, wherein the set of one or more image processing functions corresponds to one of a first set of one or more image processing functions or a second set of one or more image processing functions greater than the first set of one or more image processing functions.

As one example, with reference to FIG. 5A, the computing system or a component thereof (e.g., the confidence value generator 526) generates one or more confidence values 523 associated with the satisfaction of the mode transition criterion. With further reference to FIG. 5A, the computing system or a component thereof (e.g., the image analyzer 530) selects a set of one or more image processing functions based on the one or more confidence values 523. As one example, the image analyzer 530 or a component thereof (e.g., the function selector 534) selects a first set of one or more image processing functions (e.g., the localization function) when the one or more confidence values associated with the satisfaction of the mode transition criterion are low. As another example, the image analyzer 530 or a component thereof (e.g., the function selector 534) selects a second set of one or more image processing functions (e.g., the object recognition/classification, semantic segmentation, and localization functions) when the one or more confidence values associated with the satisfaction of the mode transition criterion are high.

In some implementations, the first set of one or more image processing functions includes an object localization function, and the second set of one or more image processing functions includes an object classification/recognition function, a semantic segmentation function, and an object localization function. In some implementations, the computing system may select the first set of one or more image processing functions when the one or more confidence values associated with the satisfaction of the mode transition criterion are high. In some implementations, the computing system may select the second set of one or more image processing functions when the one or more confidence values associated with the satisfaction of the mode transition criterion are low.

In various implementations, the method 700 further includes: detecting a query requesting a current location for a particular enrolled object; and in response to detecting the query: determining the current location for the particular enrolled object based on the enrolled object datastore; and causing presentation of a representation of the current location for the enrolled object via the display device. As one example, with reference to FIG. 6, the computing system or a component thereof (e.g., the query handler 610) obtains (e.g., receives, retrieves, etc.) the query 604 from the query source 602 requesting the current location for a particular enrolled object. As one example, the query source 602 corresponds to the user 150, and the query 604 corresponds to an alphanumeric input string, a voice input, or the like. As another example, the query source 602 corresponds to an application or program, a periodic monitoring routine, a constant monitoring routine, or the like, and the query 604 corresponds to an alphanumeric input string or the like (e.g., the enrolled object identifier). With further reference to FIG. 6, the computing system or a component thereof (e.g., the query handler 610) determines/generates a query response 612 by performing a lookup against the enrolled object datastore 515 based on the query 604 and also generates an optional notification 616 representing the query response 612 (e.g., the current location for the particular enrolled object) for presentation via the one or more displays 312.

In some implementations, the query includes a label, identifier, etc. for the enrolled object (e.g., "Where is my umbrella?" of "Where is the object with serial number XYZ?"), and the computing system obtains the current location for the enrolled object by searching the enrolled object datastore based on the label, identifier, etc. for the enrolled object provided with the query. In some implementations, the representation of the current location for the enrolled object includes a map with a visual marker for the current location of the enrolled object in relation to the map. In some implementations, the representation of the current location for the enrolled object includes a textual description of the current location of the enrolled object such as kitchen, living room, etc. In some implementations, the representation of the current location for the enrolled object includes coordinates relative to a world coordinate system (e.g., latitudinal and longitudinal coordinates) or local coordinate system. In some implementations, the representation of the current location for the enrolled object is accompanied with audible feedback, haptic feedback, and/or the like.

In various implementations, the method 700 further includes: determining whether a particular enrolled object satisfies an activity criterion based on the enrolled object datastore; and in accordance with a determination that the particular enrolled object does not satisfy the activity criterion, causing presentation of an alert notification associated with the particular enrolled object via the display device. As one example, with reference to FIG. 6, the computing system or a component thereof (e.g., the query handler 610) obtains (e.g., receives, retrieves, etc.) the query 604 from the query source 602 requesting an activity determination for a particular enrolled object. With further reference to FIG. 6, the computing system or a component thereof (e.g., the query handler 610) determines/generates a query response 612 by performing a lookup against the enrolled object datastore 515 to determine whether the particular enrolled object satisfies the activity criterion and also generates an optional notification 616 (e.g., the alert notification) representing the query response 612 for presentation via the one or more displays 312.

In some implementations, in accordance with a determination that the enrolled object satisfies the activity criterion, the computing system forgoes causing presentation of the alert notification and optionally waits to repeat the determination again for a next interval (e.g., the next hour, day, week, etc.). In some implementations, the activity criterion is satisfied when the record within the enrolled object datastore for a particular enrolled object indicates that the user has interacted with or otherwise visited the particular enrolled object within the last Y hours. For example, Y is a deterministic or a non-deterministic value. In some implementations, a user may set a monitoring routine or an alert to ensure that medication X (e.g., the enrolled object) is taken once a day. To this end, the computing system may check whether the medication X was taken daily by reviewing the record associated with the medication X in the enrolled object datastore to determine whether or not the medication X has been taken (e.g., interacted with by the user 150) and the current location of the medication X was updated today. In some implementations, the alert notification may be accompanied by or replaced with audible feedback, haptic feedback, and/or the like.

In various implementations, the method 700 further includes: determining whether a current location for a particular enrolled object satisfies a location criterion based on the enrolled object datastore; and in accordance with a determination that the current location for the particular enrolled object does not satisfy the location criterion, causing presentation of an alert notification associated with the particular enrolled object via the display device. As one example, with reference to FIG. 6, the computing system or a component thereof (e.g., the query handler 610) obtains (e.g., receives, retrieves, etc.) the query 604 from the query source 602 requesting a location determination for a particular enrolled object. With further reference to FIG. 6, the computing system or a component thereof (e.g., the query handler 610) determines/generates a query response 612 by performing a lookup against the enrolled object datastore 515 to determine whether the particular enrolled object satisfies the location criterion and also generates an optional notification 616 (e.g., the alert notification) representing the query response 612 for presentation via the one or more displays 312.

In some implementations, in accordance with a determination that the enrolled object satisfies the location criterion, the computing system forgoes causing presentation of the alert notification and optionally waits to repeat the determination again for a next interval (e.g., the next hour, day, week, or the like). In some implementations, the location criterion is satisfied when the record within the enrolled object datastore for a particular enrolled object indicates that the particular enrolled object is located at a predetermined location or at one of a plurality of predetermined locations. In some implementations, a user may create/set a monitoring routine or an alert to ensure that the enrolled object remains in a predetermined location or one of a plurality of predetermined locations. To this end, the computing system may check the record associated with the enrolled object in the enrolled object datastore to determine whether or not the enrolled object remains in a predetermined location or one of a plurality of predetermined locations. In some implementations, the alert notification may be accompanied by or replaced with audible feedback, haptic feedback, and/or the like.

According to some implementations, as represented by block 720, in response to updating the record for the enrolled object to include the current location, the method 700 further includes causing presentation of a movement notification including a representation of the current location for the enrolled object via the display device. As one example, with reference to FIG. 6, the computing system or a component thereof (e.g., the alert generator 614) generates an optional notification 616 (e.g., the movement notification) whenever a current location within the enrolled object datastore 515 is changed for an enrolled object.

For example, the computing system presents a movement notification whenever the current location changes for an enrolled object. In some implementations, the movement notification may be accompanied by or replaced with audible feedback, haptic feedback, and/or the like. In some implementations, the representation of the current location for the enrolled object includes a map with a visual marker for the current location of the enrolled object in relation to the map. In some implementations, the representation of the current location for the enrolled object includes a textual description of the current location of the enrolled object such as kitchen, living room, etc. In some implementations, the representation of the current location for the enrolled object includes coordinates relative to a world coordinate system (e.g., latitudinal and longitudinal coordinates) or local coordinate system.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to one or more microphones, one or more image sensors, and one or more motion sensors via a communication interface:
   while operating the computing system according to a first mode, obtaining audio data corresponding to ambient sound in a physical environment via the one or more microphones and motion sensor data corresponding to motion of the one or more motion sensors via the one or more motion sensors;
   determining whether at least one of the audio data and the motion sensor data satisfies a mode transition criterion;
   in response to determining that at least one of the audio data and the motion sensor data satisfies the mode transition criterion, transitioning the computing system from the first mode to a second mode; and
   while operating the computing system according to the second mode:
      obtaining one or more image frames of the physical environment based on an image frame ingestion rate via the one or more image sensors;
      determining a current location for an enrolled object by performing a set of one or more image processing functions on the one or more image frames; and
      updating a record for the enrolled object to include the current location.

2. The method of claim 1, wherein the one or more motion sensors correspond to at least one of an inertial measurement unit (IMU), an accelerometer, a gyroscope, and a magnetometer.

3. The method of claim 1, wherein the one or more microphones and the one or more motion sensors are active in the first mode, and wherein the one or more image sensors are inactive in the first mode.

4. The method of claim 1, wherein the one or more image sensors are active in the second mode, and wherein the one or more microphones and the one or more motion sensors are inactive in the second mode.

5. The method of claim 1, further comprising:
   selecting the image frame ingestion rate based on a confidence value associated with the satisfaction of the mode transition criterion, wherein the selected image frame ingestion rate corresponds to one of a first image frame ingestion rate or a second image frame ingestion rate greater than the first image frame ingestion rate.

6. The method of claim 1, further comprising:
   selecting the set of one or more image processing functions based on a confidence value associated with the satisfaction of the mode transition criterion, wherein the set of one or more image processing functions corresponds to one of a first set of one or more image processing functions or a second set of one or more image processing functions greater than the first set of one or more image processing functions.

7. The method of claim 1, further comprising:
   in response to determining that the audio data and the motion sensor data do not satisfy the mode transition criterion, maintaining operation of the computing system in the first mode.

8. The method of claim 1, wherein the audio data satisfies the mode transition criterion when the audio data matches an audio signature associated with the enrolled object within a variance threshold.

9. The method of claim 1, wherein the motion sensor data includes at least one of head pose information and body pose information associated with a user of the computing system, and the method further comprising determining a current field-of-view (FOV) relative to the physical environment based on at least one of the head pose information and the body pose information, wherein the motion sensor data satisfies the mode transition criterion when the motion sensor data indicates that the enrolled object is within the FOV based on a most recent location for the enrolled object.

10. The method of claim 9, further comprising:
    obtaining the most recent location for the enrolled object from an enrolled object datastore, wherein the enrolled object datastore includes a plurality of records for each of a plurality of enrolled objects.

11. The method of claim 1, wherein the one or more motion sensors are integrated with a wearable device, and wherein the motion sensor data satisfies the mode transition criterion when the motion sensor data indicates that the user is interacting with the enrolled object based on motion sensor data from the wearable device.

12. The method of claim 1, wherein the one or more motion sensors are integrated with a wearable device, and wherein the motion sensor data satisfies the mode transition criterion when the motion sensor data indicates that the enrolled object is moving based on motion sensor data from the wearable device.

13. The method of claim 1, wherein the computing system is further communicatively coupled to one or more biosensors, and the method further comprising obtaining biosensor data associated with a user of the computing system via the one or more biosensors, wherein the biosensor data satisfies the mode transition criterion when the biosensor data indicates that the user is interacting with the enrolled object.

14. The method of claim 1, further comprising:
    detecting a change from a first motion state to a second motion state relative to a user of the computing system;
    in response to detecting the change from the first motion state to the second motion state, determining whether the change from the first motion state to the second motion state satisfies a mode transition criterion; and
    in response to determining that the change from the first motion state to the second motion state satisfies the mode transition criterion, transitioning the computing system from the first mode to the second mode.

15. The method of claim 1, further comprising:
    detecting a change from a first application to a second application;
    in response to detecting the change from the first application to the second application, determining whether the change from the first application to the second application satisfies a mode transition criterion; and
    in response to determining that the change from the change from the first application to the second application satisfies the mode transition criterion, transitioning the computing system from the first mode to the second mode.

16. The method of claim 1, wherein updating the record for the enrolled object to include the current location includes updating the record stored within the enrolled object datastore, wherein the enrolled object datastore includes a plurality of records for a plurality of enrolled objects including the enrolled object.

17. The method of claim 16, further comprising:

detecting a query requesting a current location for a particular enrolled object; and in response to detecting the query:

determining the current location for the particular enrolled object based on the enrolled object datastore; and causing presentation of a representation of the current location for the enrolled object via a display device.

18. The method of claim 16, further comprising:

determining whether a particular enrolled object satisfies an activity criterion based on the enrolled object datastore; and in accordance with a determination that the particular enrolled object does not satisfy the activity criterion, causing presentation of an alert notification associated with the particular enrolled object via a display device.

19. The method of claim 16, further comprising:

determining whether a current location for a particular enrolled object satisfies a location criterion based on the enrolled object datastore; and in accordance with a determination that the current location for the particular enrolled object does not satisfy the location criterion, causing presentation of an alert notification associated with the particular enrolled object via a display device.

20. The method of claim 1, further comprising:

in response to updating the record for the enrolled object to include the current location, causing presentation of a movement notification including a representation of the current location for the enrolled object via a display device.

21. A device comprising:

one or more processors;

a non-transitory memory;

an interface for communicating with one or more microphones, one or more image sensors, and one or more motion sensors; and one or more programs stored in the non-transitory memory, which, when executed by the one or more processors, cause the device to:

while operating the computing system according to a first mode, obtain audio data corresponding to ambient sound in a physical environment via the one or more microphones and motion sensor data corresponding to motion of the one or more motion sensors via the one or more motion sensors;

determine whether at least one of the audio data and the motion sensor data satisfies a mode transition criterion;

in response to determining that at least one of the audio data and the motion sensor data satisfies the mode transition criterion, transition the computing system from the first mode to a second mode; and while operating the computing system according to the second mode:

obtain one or more image frames of the physical environment based on an image frame ingestion rate via the one or more image sensors;

determine a current location for an enrolled object by performing a set of one or more image processing functions on the one or more image frames; and update a record for the enrolled object to include the current location.

22. A non-transitory memory storing one or more programs, which, when executed by one or more processors of a device with an interface for communicating with one or more microphones, one or more image sensors, and one or more motion sensors, cause the device to:

while operating the computing system according to a first mode, obtain audio data corresponding to ambient sound in a physical environment via the one or more microphones and motion sensor data corresponding to motion of the one or more motion sensors via the one or more motion sensors;

determine whether at least one of the audio data and the motion sensor data satisfies a mode transition criterion;

in response to determining that at least one of the audio data and the motion sensor data satisfies the mode transition criterion, transition the computing system from the first mode to a second mode; and while operating the computing system according to the second mode:

obtain one or more image frames of the physical environment based on an image frame ingestion rate via the one or more image sensors;

determine a current location for an enrolled object by performing a set of one or more image processing functions on the one or more image frames; and update a record for the enrolled object to include the current location.

* * * * *